United States Patent [19]

Brady

[11] 4,157,273

[45] Jun. 5, 1979

[54] BONDING WITH A POLY(ARYLENE SULFIDE)-POLYTETRAFLUOROETHYLENE ADHESIVE

[75] Inventor: Donnie G. Brady, Bartlesville, Okla.

[73] Assignee: Phillips Petroleum Company, Bartlesville, Okla.

[21] Appl. No.: 560,394

[22] Filed: Mar. 20, 1975

[51] Int. Cl.$^2$ ............................................... C09J 5/04
[52] U.S. Cl. .................... 156/315; 156/320; 156/333; 260/900; 427/379; 427/409; 427/388 A; 428/419; 428/422; 428/421; 428/457
[58] Field of Search ............... 156/309, 326, 315, 327, 156/320, 333; 428/419, 411, 421, 457, 422; 427/409, 388, 379; 260/823, 79, 900, 79.1

[56] References Cited

U.S. PATENT DOCUMENTS

| | | | |
|---|---|---|---|
| 3,317,487 | 5/1967 | Smith | 260/79 |
| 3,324,087 | 6/1967 | Smith et al. | 260/79.3 |
| 3,354,129 | 11/1967 | Edmonds et al. | 260/79 |
| 3,487,454 | 12/1969 | Oates et al. | 260/900 |
| 3,616,186 | 10/1971 | Blackwell | 428/419 |
| 3,622,376 | 11/1971 | Tieszen et al. | 428/457 |
| 3,661,831 | 5/1972 | Fang | 260/32.8 A |
| 3,776,880 | 12/1973 | Blackwell | 260/37 R |
| 3,877,970 | 4/1975 | Edmonds et al. | 260/900 |

OTHER PUBLICATIONS

Smith, H. A. "A New Plastics Material for the Jet Age," *Rubber and Plastics Age,* 44, 1048 (9–1963).

*Primary Examiner*—William A. Powell
*Assistant Examiner*—J. J. Gallagher

[57] ABSTRACT

Materials are bonded together by means of an adhesive which comprises a blend of a poly(arylene sulfide) and polytetrafluoroethylene. Coatings of the adhesive can be applied to each of the materials to be bonded and partially cured. The coated surfaces can then be placed in contact with one another and curing of the adhesive completed.

7 Claims, No Drawings

BONDING WITH A POLY(ARYLENE SULFIDE)-POLYTETRAFLUOROETHYLENE ADHESIVE

It is known that poly(arylene sulfide) resins can be employed as adhesives. In accordance with this invention, it has been found that the effectiveness of such an adhesive can be increased by blending polytetrafluoroethylene with the poly(arylene sulfide) resin.

The poly(arylene sulfide) resins which are employed in this invention can be prepared by the process described in U.S. Pat. No. 3,354,129, for example. As disclosed in the patent, these polymers can be prepared by contacting a polyhalo-substituted cyclic compound containing unsaturation between adjacent ring atoms and an alkali metal sulfide in the presence of a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R—S— where R is phenylene, biphenylylene, napthylene, oxydiphenylene or a lower alkyl-substituted derivative thereof. By "lower alkyl" is meant alkyl groups having 1 to 6 carbon atoms such as methyl, propyl, isobutyl, n-hexyl, and the like.

The invention is broadly applicable to the use of poly(arylene sulfides) formed by any technique. Such polymers can be manufactured as described in U.S. Pat. No. 2,513,188 prepared by reacting mixtures of p-dichlorobenzene and 1,2,4-trichlorobenzene with sulfur and a metal sulfide at fusion temperatures. The polymers can also be manufactured by the method described in British Pat. No. 962,941 wherein metal salts of halothiophenols are heated at a polymerizing temperature.

The poly(arylene sulfide) resins, which must be fusible, can be linear or crosslinked. Generally, the poly(arylene sulfide) resins will have an inherent viscosity within the range of about 0.05 to about 0.4, preferably about 0.1 to about 0.35, determined at 206° C. in 1-chloronaphthalene at a polymer concentration of 0.4 g/100 ml solution. The presently preferred polymer is poly(phenylene sulfide), e.g., poly(p-phenylene sulfide).

The polytetrafluoroethylene can be used in the form of a molding resin, such as those available commercially, or it can be employed in the form of a dispersion.

Although the ratio of polytetrafluoroethylene to poly(arylene sulfide) can vary over a wide range, the polytetrafluoroethylene generally will be used in an amount within the range of about 0.5 to about 50, preferably about 1 to about 10, parts by weight per 100 parts by weight poly(arylene sulfide).

If desired, fillers or additives such as pigment, stabilizers, softeners, extenders, or other polymers can be present in the composition comprising the poly(arylene sulfide) and polytetrafluoroethylene. For example, there can be present substances such as graphite, carbon black, titanium dioxide, glass fibers, carbon fibers, metal powders, magnesia, silica, asbestos, wollastonite, mica, and the like.

Although the poly(arylene sulfide), the polytetrafluoroethylene, and fillers or additives, if used, can be mixed in any manner capable of providing good mixing, the use of a ball or rod mill, which provides particle size reduction as well as mixing, is generally preferred. It is preferred that a diluent be employed to aid in the mixing and subsequent application to the surfaces to be bonded. Examples of suitable diluents include water, alcohols, e.g., ethylene glycol, propylene glycol, methyl alcohol, ethyl alcohol, isopropyl alcohol, hydrocarbons, e.g., benzene, toluene, heptane, or cyclohexane, or mixtures of such diluents, e.g., kerosene, diesel fuel, or aqueous alcohols. A procedure which has been found to be particularly effective comprises ball milling the polytetrafluoroethylene with propylene glycol, followed by addition of the poly(arylene sulfide) resin, optionally together with additional propylene glycol, and further ball milling.

The composition comprising the poly(arylene sulfide) resin and polytetrafluoroethylene can be applied as an adhesive using conventional techniques, followed by application of heat to effect fusion and curing of the composition to bond together the substrate surfaces. Although bonding can be accomplished by applying the composition to only one substrate, it is preferred that the composition be first applied as one or more coatings to each substrate, with heating after each application to effect fusion and partial curing of the composition. In these steps, the coated substrate surfaces should be heated at a temperature above the melting point of the poly(arylene sulfide), generally within the range of about 400° F. (204.4° C.) to about 800° F. (426.7° C.), preferably about 550° F. (287.8° C.) to about 700° F. (371.1° C.), for a period of time within the range of about 30 seconds to about 24 hours, preferably about 1 minute to about 2 hours. Although the heating can be conducted in an inert gas or under vacuum, preferably the heating is carried out in an oxygen-containing gas such as air, most conveniently at about atmospheric pressure. In this same preferred embodiment, the coated substrate surfaces to be bonded are then held together under applied pressure, with the coated surfaces facing each other, and the resulting assembly is heated at a temperature above the melting point of the poly(arylene sulfide), generally within the range of about 400° F. (204.4° C.) to about 800° F. (426.7° C.), preferably about 550° F. (287.8° C.) to about 700° F. (371.1° C.), for a period of time within the range of about 30 seconds to about 24 hours, preferably about 10 minutes to about 2 hours, to provide additional curing of the composition and bonding of the substrate surfaces. Here, also, the heating can be conducted in an inert gas or under vacuum, but is preferably carried out in an oxygen-containing atmosphere such as air, most conveniently at about atmospheric pressure.

The composition comprising the poly(arylene sulfide) and polytetrafluoroethylene can be employed to bond surfaces of any substrate or substrates which can be heated above the fusion temperature of the arylene sulfide polymer without substantial deformation. Thus, the substrate can be formed from a thermally stable polymeric material or from a substance such as metal, glass, ceramic or stone. The adhesive compositions are particularly useful for bonding metals such as aluminum, iron, titanium, copper, and chromium or metal alloys such as steel, including stainless steel, and brass.

EXAMPLE

Two series of runs were conducted to evaluate as adhesives compositions prepared from poly(p-phenylene sulfide) (PPS) and polytetrafluoroethylene (PTFE). The PPS, prepared by the process of U.S. Pat. No. 3,354,129 from p-dichlorobenzene, sodium sulfide, and N-methyl-2-pyrrolidone, had an inherent viscosity of 0.16, determined at 206° C. in 1-chloronaphthalene at a polymer concentration of 0.4 g/100 ml solution. The PTFE was Teflon 7C resin (Du Pont), a high molecular weight molding grade polytetrafluoroethylene.

In Runs A, compositions containing 10, 25 and 50 parts by weight PTFE per 100 parts by weight PPS were prepared by ball milling 10, 25 or 50 g, respectively, PTFE with 200 ml propylene glycol for 48 hours, followed by addition of 100 g PPS and ball milling for an additional 24 hours. Enough propylene glycol (25-125 ml) was then added to make the mixtures sufficiently mobile to be removed as slurries from the balls. A slurry containing no PTFE, for the purpose of comparison, was prepared by ball milling 100 g PPS with 200 ml propylene glycol for 24 hours.

In Runs B, slurries containing 1, 3, 5, 7.5 and 10 parts by weight PTFE per 100 parts by weight PPS were prepared by ball milling 1, 3, 5, 7.5 or 10 g, respectively, PTFE with 200 ml propylene glycol for 48 hours, followed by addition of 100 g PPS and 50 ml propylene glycol and ball milling for an additional 24 hours. A slurry containing no PTFE, for the purpose of comparison, was prepared by ball milling 100 g PPS with 200 ml propylene glycol for 24 hours.

Each of the slurries in Runs A and B was applied as three coats to steel coupons previously washed with toluene and with acetone as well as subjected to grit blasting. After application of the first coat, the coating was fused and partially cured by heating the coated substrate at 600° F. (315.6° C.) for 30 minutes. Two additional coats were then applied, with fusion and partial curing by heating the coated substrate at 600° F. (315.6° C.) for 15 minutes after each application. Pairs of coated coupons were clamped together, with the coated surfaces facing each other and overlapped one-half inch, and each clamped assembly was heated at 700° F. (371.1° C.) for 1 hour to effect additional curing of the composition between the coupons. The adhesive lap shear strength of the cured compositions was then determined at room temperature (about 25° C.) by the method of ASTM D 1002-53T. The data are summarized in the following table.

| Parts PTFE/100 parts PPS, by weight | Adhesive Lap Shear Strength, psi | |
|---|---|---|
| | Runs A | Runs B |
| 0 | 2540 | 2552 |
| 1 | | 3032 |
| 3 | | 3032 |
| 5 | | 3560 |
| 7.5 | | 3426 |
| 10 | 3373 | 3010 |
| 25 | 2780 | |
| 50 | 2733 | |

The above table shows that the adhesive lap shear strength of each of the cured compositions comprising PPS and PTFE was superior to that of either of the cured PPS compositions containing no PTFE.

While this invention has been described in conjunction with presently preferred embodiments, it obviously is not limited thereto.

What is claimed is:

1. The method of bonding a first material to a second material which comprises applying a coating of a mixture of a poly(arylene sulfide) and polytetrafluoroethylene to each of the materials, heating each coating to effect a partial cure of the poly(arylene sulfide) before the two materials are placed adjacent one another, and thereafter placing the two materials adjacent one another so that the thus partially cured coatings of each material contact one another, and heating the mixture to effect a cure of the poly(arylene sulfide) and thereby bond the two materials together.

2. The method of claim 1 wherein the poly(arylene sulfide) is poly(phenylene sulfide).

3. The method of claim 1 wherein said mixture comprises about 0.5 to about 50 parts by weight polytetrafluoroethylene per 100 parts by weight poly(arylene sulfide).

4. The method of claim 1 wherein a plurality of coatings of said mixture are applied to each material in sequence, and the coated materials are heated after each coating is applied to effect a partial cure of the poly(arylene sulfide) before the two materials are placed adjacent one another.

5. The method of claim 1 wherein the coating on each material is heated in the temperature range of about 400° F. to about 800° F. for about 30 seconds to about 24 hours, and thereafter the coatings in contact with one another are heated in the temperature range of about 400° F. to about 800° F. for about 30 seconds to about 24 hours.

6. The method of claim 5 wherein said materials are metals.

7. The method of claim 1 wherein said mixture comprises about 1 to about 10 parts by weight polytetrafluoroethylene per 100 parts by weight poly(arylene sulfide).

* * * * *